United States Patent Office 3,351,567
Patented Nov. 7, 1967

3,351,567
PRODUCTION OF ATTRITION-RESISTANT ALUMINA CATALYST
Reno W. Moehl, Evanston, Ill., assignor to Universal Oil Products Company, Des Plaines, Ill., a corporation of Delaware
No Drawing. Filed Dec. 19, 1963, Ser. No. 331,938
4 Claims. (Cl. 252—466)

This invention relates to improved means for effecting hydrogen production and in particular to the use of an improved attrition resistant catalyst composite adapted to effect the decomposition of a hydrocarbon stream to produce high yields of hydrogen in a fluidized system.

Hydrocarbon oils and gases, such as are readily and abundantly available as a result of petroleum processing, are an excellent source of hydrogen and a considerable number of processes have been designed to effect the conversion of said hydrocarbons to hydrogen. The normally gaseous hydrocarbons, such as methane, because of the high ratio of hydrogen to carbon, are considered to be a particularly attractive source of hydrogen. The decomposition of hydrocarbons to hydrogen has been effected at high temperature decomposition conditions in the presence of supported Iron Group metals. It is generally considered that higher conversions are most readily attained through the combined effect of an acid-acting cracking catalyst, such as silica-alumina, as a supporting material. However, it has now been determined that a catalyst consisting of alumina, which is comparatively neutral, and a metal of Group VIII, and in particular, nickel of the Iron Group of metals, exhibits considerably greater activity with respect to the decomposition of normally gaseous hydrocarbons to hydrogen than does a catalyst consisting of silica-alumina and nickel. In other words, the comparatively neutral alumina unexpectedly imparts a higher degree of activity to the catalyst than does the acid-acting high silica content silica-alumina catalyst, and this is so despite the recognized superiority of silica-alumina as gas-oil cracking catalysts.

In carrying out a continuous hydrogen producing operation on a commercial scale it is advantageous to utilize a fluidized or moving bed system to effect an efficient catalytic contact with the hydrocarbon stream. It is also of advantage to provide for the continuous fluidized transporting of the catalyst particles from the reaction zone to the regeneration zone, or carbon removal zone, and from the latter back to a reaction zone; however, it has been found that most of the all-alumina base catalyst are more susceptable to rapid attrition in a fluidized bed type of conversion system and that the catalyst loss may be too high for a successful commercial use. As a result, substantial research and experimental work has been undertaken to improve the strength or attrition resistance characteristics of a decomposition catalyst composite utilizing a carrier material which is substantially all alumina.

Development work has shown that a satisfactory hardness and attrition resistance can be obtained by the incorporation of a small amount (4% to 5%) of silica with the alumina as a carrier. In addition, it has now been found that a consistently satisfactory hard and attrition resistant catalyst carrier particles of all-alumina, in a finely divided form, can be obtained by the comminution or formulation of the particles while the alumina is in a pseudoboehmite state. Such state may be defined as one which is a variant hydrate of alumina, intermediate between amorphous alumina and boehmite, the latter being the alpha-alumina monohydrate (Alpha-$Al_2O_3 \cdot H_2O$). It appears that if an alumina hydrogel is aged, heated or otherwise permitted to attain the change in physical structure to be in the boehmite state or have large crystallite sizes, then upon comminution the result will be soft unsatisfactory attrition resistant particles.

For reference purposes it may be noted that there are various types of alumina hydrates which can be prepared.

Alpha-$Al_2O_3 \cdot 3H_2O$ or bayerite is formed by aging boehmite in a cold basic solution, but is unstable and gradually transformed into gibbsite.

Gamma-$Al_2O_3 \cdot 3H_2O$ or gibbsite is a stable form of alumina and may be prepared by aging boehmite in a cold basic solution.

Alpha-$Al_2O_3$, known as corundun, is a hard dense form stable at temperatures over 1800° F.

The usual type of alumina obtained from precipitation and the synthetic preparation thereof, after calcining or aging, effects its transformation to the stable "gamma" form. For example, ammonium hydroxide is added to a water solution of aluminum chloride or of aluminum nitrate and an amorphous alumina floc is precipitated which grows in crystal size to the crystalline boehmite state upon subsequent washing and heating treatments or aging. For pilled or pellet forms of catalyst, the rapid crystal growth may be a desirable result, but where the alumina is desired to be in a powder or microspherical form, for use in a continuous fluidized system, and prepared by a spray drying or spin drying step from an aqueous slurry of the alumina precipitate, then the material must have attrition resistance to be able to withstand high circulation rates. The spray drying of a slurried boehmite, bayerite or gibbsite form of alumina has definitely been found to result in a very poor strength material. It appears that where the crystalline structure is large or substantially fixed at the time of the spray drying of the alumina into fine particles, there is a white chalky nature to such particles and rapid attrition to resulting finished catalyst when used in a fluidized conversion system.

Conversely, as noted hereinbefore, where the spray drying is carried out with alumina which is not in a full crystalline state, as for example, in the pseudoboehmite state, then the resulting comminuted alumina particles after calcination are of a hard resistant nature. It appears that the particles undergo a physical change subsequent to their formation and acquire both further crystallization and hardness at the same time.

At the present time, it appears that the literature recognizes the pseudoboehmite form of alumina as one which has a crystallite size of the order of 25 to 30 Angstroms which is approximately half the usual laboratory prepared boehmite crystallite size of 55 to 60 Angstroms. Surface area for the pseudoboehmite will also be about twice that of boehmite and in the range of 300 to 350 square meters per gram. In X-ray diffractometer scanning of pseudoboehmite, it is found that there is a shift of certain peaks toward lower angles, due to less intensities from crystalline structure. In other words, the most intense peak for pseudoboehmite will shift say about 1° to 2° $2\theta$ as compared with boehmite and the identification of such pseudoboehmite form is made on this basis.

In accordance with the present invention, it has also been discovered that still better attrition resistance for an all-alumina base, or substantially all-alumina base, decomposition catalyst is obtained by commingling the activating metal, as for example an acid nickel salt, with the alumina hydrogel slurry to the spray drier, or other comminution equipment. Thus, the active component is in the resulting spray dried particles and upon completing a subsequent calcination step the catalyst is in hard finished form. Prior practice has generally entailed effecting the comminution of the slurried, washed hydrogel precipitate and then calcining the dried alumina carrier particles prior to impregnation with the metal salt solution. After impregnation, the catalyst particles are again dried and calcined to provide the finished product. It has not been fully determined or understood as to whether the added metal salt to the spray drier feed assists in retaining an amorphous pseudoboehmite state to the alumina or has its own independent effect on the product. In any event, for both alumina-silica and all-alumina base catalysts, it may be seen that the present procedure of adding the nickel salt to the slurry feed not only provides a more attrition resistant catalyst but, in addition, effects the elimination of separate impregnation and recalcination steps in the overall manufacturing procedure.

It is thus an object of the present invention to provide an improved attrition resistant decomposition catalyst for use in a fluidized hydrogen producing system.

It is also a particular object of the invention to provide an improved and harder subdivided decomposition catalyst suitable for use in a fluidized hydrocarbon conversion system by effecting the formation of the finely divided alumina-nickel particles from an alumina gel or slurry containing an added nickel salt solution.

Thus, broadly the present invention embodies a process for the fluidized production of hydrogen in a manner which comprises contacting a normally gaseous hydrocarbon stream at decomposition conditions with attrition resistant subdivided alumina-nickel catalyst particles consisting predominantly of alumina as a base and which catalyst particles are comminuted from an alumina hydrogel slurry containing a nickel salt, and resulting subdivided particles are subsequently calcined to provide the desired hard attrition resistance.

The term "alumina" as used herein with respect to the catalyst base or carrier material, refers to the use of all-alumina or predominantly all-alumina, as for example, an alumina-silica composite where the alumina comprises at least about 90% of the mixture.

In one specific embodiment, the present invention provides in connection with a process for producing hydrogen by the fluidized contacting of a normally gaseous hydrocarbon stream at decomposition conditions with subdivided catalyst particles, the improved processing operation which comprises, contacting such stream with subdivided essentially alumina-nickel catalyst particles consisting of from 90% to 98% alumina and from 10% to 2% silica as a base therefor, with such particles being initially comminuted and formed from a hydrogel slurry in turn prepared from a mixed alumina-silica precipitate, and said slurry having added thereto an acid nickel salt in an amount providing a catalytically active finished catalyst, and the resulting comminuted and impregnated particles are subsequently calcined to provide the desired hard attrition resistance for optimum fluidized processing.

In another specific embodiment, the invention embodies an optimum method for effecting the decomposition of a hydrocarbon stream in a fluidized system to produce hydrogen and carbon which comprises, contacting said stream at decomposition conditions with a finely divided alumina-nickel catalyst particles having improved attrition resistance and which particles have been comminuted or formed with the alumina in a pseudoboehmite state from a nickel salt containing alumina hydrogel slurry prepared from a precipitate containing the alumina in a pseudoboehmite state, whereby subsequent heating or calcining permits the formation of a hard attrition resistant catalyst composite.

The present invention may also be considered to be directed to an improved method for preparing an active decomposition catalyst with an essentially all-alumina base which is of a hard attrition resistant nature, as well as directed to hydrogen production in accordance with the process of this invention, where a normally gaseous hydrocarbon stream is contacted in a fluidized system with a finely divided catalyst of primarily an all-alumina base and a metal of Group VIII of the Periodic Table, preferably nickel, where the alumina-active metal particles have been formed from an alumina or alumina-silica hydrogel precipitate slurry having a solution of the activating metal salt commingled therewith to provide resulting comminuted particles with the metal impregnation therein, whereby a subsequent calcination then provides the desired hard attrition resistant nature.

A normally gaseous hydrocarbon stream as referred to herein, relates to natural gas or refinery "off-gas" comprising principally methane, but also including minor quantities of ethane, ethylene, propane, propylene, butane, isobutane, butylene, isobutylene, etc. While optimum conversion to hydrogen results from the treatment of a normally gaseous hydrocarbon in accordance with the present invention, like treatment of heavier hydrocarbons will also result in the conversion thereof to hydrogen although not necessarily to the same or an equivalent extent.

For a fluidizied hydrogen producing system, where the catalyst undergoes contact in separate conversion and regeneration zones, then a nickel activation is the preferred catalyst of the various Iron Group or Group VIII metals of the Periodic Table, as hereinbefore observed. There are, however, various nickel salts which may be used to commingle with the slurry feed to the spray drier or other comminution means. For example, a nickel nitrate solution is a very desirable form of effecting the incorporation of nickel into the alumina or alumina-silica hydrogel of the slurry, an amount being used to generally provide from about 5% to 20% nickel, by weight of the finished calcined catalyst particles. Another form of nickel addition may be effected by using nickel chloride to commingle with the hydrogel slurry. In other words, it is not intended to limit the present invention to the use of any one impregnating solution or salt to commingle with the hydrogel slurry which is to be comminuted with the nickel content incorporated.

In preparing the improved attrition resistant alumina-silica base catalyst by adding a nickel salt to the alumina-silica precipitate slurry, there is apparently not the same concern for insuring that the alumina is retained in an amorphous form with crystallite sizes not greater than an equivalent to pseudoboehmite; however, with an all-alumina floc this may be of concern. In other words, if the nickel nitrate solution is added to a washed precipitate without delay and without heating, then the nitrate ions can be relied upon to retard crystallite growth; but, if there is delay in the nickel salt addition to the washed slurry, then steps may be required to insure control of the alumina state.

One particularly advantageous step resides in the controlled washing of the all-alumina precipitate or floc prior to the formation thereof into an aqueous slurry with a commingled solution of a metal salt which is comminuted into the desired subdivided particles. Prior washing operations have generally been carried out in multiple stages to insure the substantially complete removal of acid ions, as for example the chloride or nitrate ions which are in the alumina floc at the time of precipitating amorphous alumina from an aluminum chloride or an aluminum nitrate salt solution. A substantially complete removal of the ions has been found to cause relatively rapid crystal growth within the alumina such that boehmite state is attained in a short period of time by aging or by heating. Conversely, the improved operation for providing attrition resistance effects a controlled washing where residual acid ions, depending upon the salt from which the material is prepared, remain in combination with the alumina at the time of preparing a slurry feed for spray drying. The amount of acid ion may vary from about 0.20% to about 0.30% as $Cl^-$ percent of the hydrogel, depending upon the time involved between the formation of the alumina precipitate and the initiation of the actual comminuting operation, as well as upon the time involved prior to the addition of the nickel salt, or other Iron Group metal salt. In other words, where the manufacturing steps are carried out in a sequential manner leading to the spray drying operation within but a matter of a few hours after the alumina floc formation and washing steps and the addition of the activating metal salt, then there may be a relatively low percentage of acid ion left in the slurry as it is fed to the spray drying equipment. However, on the other hand, where the time period between alumina precipitation step and the metal salt commingling step, and the spray drying step is lengthened and becomes greater than about 10 or 12 hours, then the acid ion content is preferably in the range of about 0.30 Cl− percent of the amorphous alumina precipitate at the time of preparing such precipitate as an aqueous slurry for the salt commingling and comminution steps.

Another advantageous procedure for controlling crystallite growth in the amorphous alumina precipitate resides in the regulation of temperature during the washing steps as well as during the precipitation of the alumina floc from the aluminum salt by the ammonium hydroxide solution. In other words, the precipitation step may be carried out at a temperature below the normal room temperature and down to the order of about 40° F., so as to reduce the tendency for crystal growth in the alumina hydrogel. Subsequently, instead of effecting the usual six or seven washing stages, for the purification and elimination of acid ions from the precipitate, that are carried out at slightly elevated temperatures, there may be a stirring and washing of the precipitate in each of the successive washing stages at a temperature equivalent to about room temperature or at a lower temperature, down to the order of approximately 40° F., to likewise reduce the tendency for crystallite growth in the alumina hydrogel.

The separate controlled steps with respect to leaving residual acid ions in the slurry and temperature control during precipitation and/or during the washing stages may be utilized independently or in combination with one another to in turn provide the desired pseudoboehmite state for the alumina charge for slurrying and spray drying, whereby the desired attrition resistance is attained in the final carrier material or finished catalyst subsequent to calcination.

The following examples are presented to illustrate the process of this invention, however, such examples are for the purpose of illustration only and are not intended as a limitation in any manner on the generally broad scope of this invention.

*Example I*

An alumina-silica gel precipitate of 95% alumina and 5% silica was prepared by adding acidified silica sol to dilute aluminum chloride and precipitating with aqueous ammonium hydroxide. The filtered precipitate was washed several times by separate stirrings and filterings in successive steps with weakly ammoniated room temperature water and then spray dried in a pilot plant sized spray drier of approximately 5 foot diameter, in an air atmosphere introduced at 850° F. The air stream passes downwardly concurrently with the particles and leaves at a temperature of about 300° F., such that all heat is utilized in evaporation of water content and there is no change in the crystallite size or state of hydration of the alumina. The resulting collected spray dried microspheres were subsequently rewashed until they were substantially chloride free and then subjected to both steam and air calcination at a temperature range of from 1400° F. to 1550° F. prior to nickel impregnation. In the impregnation step, the microspheres of alumina were contacted with a nickel nitrate solution to provide a resulting 9.7% nickel content, by weight of the composite, after drying and calcining again at about 850° F.

In order to determine the hardness of the particles and their resistance to attrition when used under fluidized operation conditions, a portion of the particles were subjected to a standard 42 hour attrition test. The apparatus for the attrition test embodies an approximately 27″ long by 1½″ I.D. lower tube with a perforate disc at the bottom, an enlarged upper 22″ long by 5″ I.D. chamber, and an overhead fines collecting flask. An air jet stream, with a velocity of about 890 feet per second passes up through a 45 gram catalyst sample in the lower tube and effects fluidization and attrition of the catalyst particles as they collide with each other. The weight percent recovery of fines collected in the overhead flask at the end of 12 hours of operation is determined as one measure for comparison purposes. Also, the average hourly rate of fines production for the next 30 hours (from 12 to 42 hours) is calculated to provide another evaluation guide.

The nickel impregnated catalyst of the present example, when subjected to the aforementioned 42 hour attrition test provided an initial fines loss of 9.4% by weight at the end of the first 12 hours of attrition testing, and an average hourly rate of fines production equal to 0.23% for the 12 to 42 hour period.

*Example II*

In another instance, an alumina-silica hydrogel precipitate comprising 95% alumina and 5% silica was prepared in the manner set forth in connection with Example I. Also, the filtered precipitate was washed several times by separate stirring and filterings with weak ammoniacial water at room temperature. The precipitate was then made into an aqueous slurry which in turn had nickel nitrate added thereto in an amount to provide 2% nickel, by weight of the resulting spray dried catalyst. The slurry with the nickel salt was then fed to a pilot plant size spray drier to effect the communition of finely divided particles into air atmosphere being introduced at 850° F. The resulting finely divided spray dried particles containing the added nickel was then subjected to calcination at a temperature approximately 1200° F.

In order to determine hardness, a portion of the particles were subjected to attrition testing in the manner set forth in connection with Example I and results showed that the attrition provided an initial fines loss of 4.4% by weight at the end of the first 12 hours and an average hourly rate of fines production equal to 0.05% for the 12 to 42 hour period.

A comparison of the results of Examples I and II shows that the catalyst having the nickel component added ahead of the spray drying operation even though containing a lesser percent of nickel, provided superior attrition resistance.

*Example III*

In this example, an alumina gel precipitate was prepared by the room temperature precipitation of aluminum chloride with ammonium hydroxide to provide an amorphous alumina floc. The precipitate in this instance was subjected to seven separate washings and filterings to effect purification and partial removal of chloride ions. The washed alumina floc was then formed into an aqueous slurry and fed into the pilot plant sized spray drier to effect the comminution of finely divided particles in a hot air atmosphere of 850° F. These particles were subjected to calcination in air at a temperature of the order of 1200° F. Following calcination the all-alumina finely divided particles were subjected to impregnation with a nickel nitrate solution in an amount to provide 8.9% of nickel by weight of the finished catalyst, the catalyst being again dried and calcined at an elevated temperature of approximately 1200° F. following the impregnation with nickel.

The thus impregnated catalyst, when subjected to the standard 42 hour attrition test provided an initial fines loss of 4.6% by weight, at the end of the first 12 hours of testing, and an average hourly rate of fines production equal to 0.09% for the 12 to 42 hour period.

Example IV

In this test an all-alumina gel precipitate was prepared in a manner similar to that set forth in connection with Example III; however, in this instance the washed precipitate which was formed into a slurry for spray drying had a nickel nitrate solution added thereto in an amount to provide approximately 7% nickel, by weight of the finished catalyst. The slurry with the nickel salt added was then spray dried in a manner similar to that previously described in connection with the other examples in an air atmosphere of about 850° F. to provide finely divided microspherical catalyst particles. These particles were subjected to calcination at approximately 1200° F. following the spray drying operation and prior to use or for attrition testing.

The present catalyst was subjected to the 42 hour attrition test and results showed an initial fines loss of 2.6% by weight at the end of the first 12 hours of testing, and an average hourly rate of fines production equal to 0.04% for the 12 to 42 hour period.

Here again, in comparing catalyst of Example IV with that of Example III, there will be noted that the catalyst spray dried with the added nickel provided a resulting harder more attrition resistant catalyst.

I claim as my invention:

1. A process of catalyst manufacture which comprises precipitating an amorphous hydrous alumina, forming the resultant undried amorphous precipitate into an aqueous slurry containing a salt of a metal of Group VIII of the Periodic Table, thereafter spray drying said slurry to form finely divided metal-containing particles, and then calcining said particles to form a hard and attrition-resistant catalyst.

2. The process of claim 1 further characterized in that said metal is nickel.

3. The process of claim 1 further characterized in that said salt is nickel nitrate.

4. The process of claim 1 further characterized in that said salt is nickel chloride.

References Cited

UNITED STATES PATENTS

| | | | |
|---|---|---|---|
| 2,212,026 | 8/1940 | Komarewsky | 252—466 X |
| 2,894,900 | 7/1959 | Hemminger | 23—143 X |
| 2,904,608 | 9/1959 | Holm et al. | 252—466 X |
| 2,911,288 | 11/1959 | Viles | 23—212 |
| 2,988,520 | 6/1961 | Braithwaite | 252—455 |
| 2,991,255 | 7/1961 | Malley et al. | 252—455 |
| 3,120,495 | 2/1964 | Innes | 252—466 X |
| 3,188,174 | 6/1965 | Kehl et al. | 252—466 X |
| 3,193,349 | 7/1965 | Mooi | 252—466 X |

OTHER REFERENCES

Bulletin de la Societe Chimique de France (1958), pages 1301–1310—article by Denis Papee et al. entitled: Recherches sur la Constitution des Gels et des Hydrates Crystallises d'Alumine.

OSCAR R. VERTIZ, *Primary Examiner.*

B. LEVENSON, *Assistant Examiner.*